United States Patent Office 3,598,828
Patented Aug. 10, 1971

3,598,828
1-OXA-3,8-DIAZA SPIRO(4,5)-2-DECANETHIONE COMPOUNDS
Gilbert Regnier, Sceaux, Roger Canevari, Clamart, Jean-Claude Le Douarec, Suresnes, and Jacques Duhault, Chatou, France, assignors to Societe en nom Collectif "Science Union et Cie, Societe Francaise de Recherche Medicale," Suresnes, France
No Drawing. Filed July 25, 1969, Ser. No. 845,061
Claims priority, application Great Britain, July 29, 1968, 36,100/68
Int. Cl. C07d 29/34
U.S. Cl. 260—293.4F
9 Claims

ABSTRACT OF THE DISCLOSURE

There are provided novel 1-oxa-3,8-diaza-8-phenethyl spiro(4,5) - 2 - decanethiones which may, if desired, be substituted on the phenyl nucleus by halogen, trifluoromethyl, lower alkyl or lower alkyloxy having from 1 to 4 carbon atoms in the alkyl moiety, methylenedioxy, sulfamido, dimethylsulfamido, nitro, amino or acylamino groups.

These compounds possess bronchodilator, antitussive, analgesic, anti-inflammatory and gastric antisecretory properties.

RELATED APPLICATIONS

This application claims priority from corresponding British provisional specification No. 36,100 filed July 29, 1968.

SUMMARY OF THE INVENTION

There are provided novel 1-oxa-3,8-diazaspiro(4,5)-2-decanethiones of the General Formula I

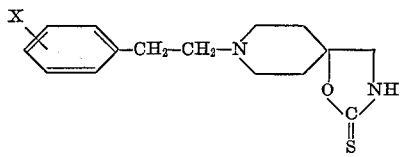

wherein X is hydrogen, halogen, trifluoromethyl, lower alkyl, lower alkoxy, methylenedioxy, sulphamido, dimethylsulphamido, nitro, amino, acylamino of the formula RCONH wherein R is lower alkyl, phenyl, or para-chlorophenyl. The scope of the invention includes the alkali metal salts and the physiologically tolerable acid addition salts of the compounds of Formula I, as well as methods of producing all of these compounds.

The compounds or their salts are valuable pharmaceutical products possessing bronchodilator, antitussive, analgesic, anti-inflammatory and gastric antisecretory properties.

The novel compounds of the present invention may be prepared by cyclizing a piperidinol of General Formula II with carbon disulphide in accordance with the following reaction scheme.

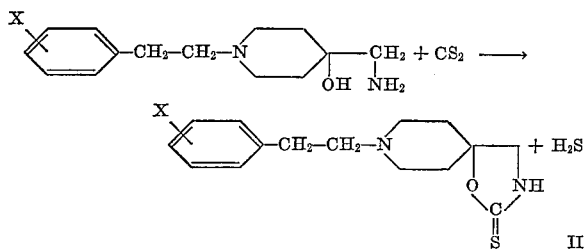

wherein X is as above.

The reaction is carried out by heating the reactants in a low molecular weight water miscible alcohol if desired, in the presence of an alkali metal hydroxide. Completion of the reaction is signified by cessation of the evolution of hydrogen sulphide. The piperidinols of Formula II which are used as starting material in the preparation compounds of the present invention may be readily obtained from the corresponding cyanhydrin by reduction thereof in accordance with methods well known in the art. The starting cyanhydrins are either known compounds or may be readily prepared from known starting materials by methods familiar to those skilled in the art.

A suitable mode of reduction is by treatment of the cyanhydrin in tetrahydrofuran solution with a reducing agent, suitably an inorganic chemical reducing agent such as lithium aluminum hydride and the like. An especially suitable method for obtaining the starting piperidinols is described in U.S. Pat. No. 3,399,192.

DESCRIPTION OF THE PREFERRED EMBODIMENTS

The compounds of the present invention are compounds of Formula I wherein the phenyl group thereof may be substituted in the o-, m-, or p-position with halo such as chloro, bromo or fluoro, lower alkyl such as methyl, ethyl, propyl, isopropyl, butyl, or sec-butyl, lower alkoxy such as methoxy, ethoxy, propoxy, butoxy, tert-butoxy or the like, methylenedioxy, sulphamido, dimethylsulphamido, nitro, amino, or acylamino of the formula RCONH wherein the R group is lower alkyl of 1 to 4 carbon atoms such as methyl, ethyl, propyl, or butyl, phenyl, or para-chlorophenyl.

Also included in the scope of the present invention are the pharmaceutically acceptable salts of the compounds of Formula I. Since such compounds are amphoteric such salts will include the alkali metal salts such as the sodium, potassium, and lithium salts. Also included are the acid addition salts for example the hydrochlorides, hydrobromides, sulphates, phosphates, sulphamates, acetates, propionates, methanesulphonates, maleates, fumarates, tartrates, citrates, oxalates and benzoates.

All of the compounds of the present invention show a characteristic absorption in their infrared spectra lying between 1530 and 1550 cm.$^{-1}$. This band is characteristic of the

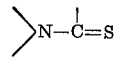

group.

In the preferred modification of the process in preparing the compounds of the present invention, the piperidinol of General Formula II is taken up in a water miscible alcohol suitably a low molecular weight alkanol, for example ethanol, isopropanol, tert-butanol or the like together with a small excess, suitably from about 5 to about 20% preferably about 10% of an excess of carbon disulphide in a similar solvent. While it is preferred that the alkanol be substantially dry, absolutely anhydrous conditions are not required. An alkanol containing about 5% of water is quite suitable. Upon addition of the reactants a white precipitate immediately forms.

In a further modification of the present invention, the reaction mixture may further contain an alkali metal hydroxide such as sodium or potassium hydroxide in an amount equimolar with that of the piperidinol.

In both of the foregoing modifications, the reaction mixture is heated, preferably under reflux for from about 6 to about 12 hours. The reaction is deemed complete when no further evolution of hydrogen sulphide is noted.

The reaction mixture is then cooled and the product which forms as a solid residue is then isolated. Where the reaction has been carried out in the presence of alkali the residue takes the form of the alkali metal salt.

The reaction product is then purified. The purification may be carried out by several procedures well known in the art. Such procedures include crystallization, chromatography, and the formation of either alkali metal salts or acid addition salts followed by decomposition of such salts in suitable solvents at a pH of about 7 after said salts have been purified by crystallization or the like.

One of the most important impurities in the reaction product is collodial sulphur. This may be removed in the following manner. The reaction product, either in the form of a free base, or in the form of the alkali metal salt, is dissolved in an excess of dilute acid, suitably mineral acid, for example N-hydrochloric acid. The product dissolves in the acid and the precipitated colloidal sulphur is removed as a residue by filtration. The product is then reprecipitated from the acid solution by the addition of a slight excess of a weak base, suitably an alkali metal carbonate or the like.

The thus obtained base may then be purified further. In one mode of procedure, the base is taken up in a suitable solvent preferably an alkanol such as ethanol to which there is added a solution of either the alkali metal hydroxide or the desired acid in the same solvent. In the case of hydrochlorides and hydrobromides the acid is introduced in gaseous, anhydrous form. The alkali metal salt or the acid addition salt, as the case may be, is then isolated from the solvent, usually as a precipitate, in the customary manner.

PHARMACOLOGICAL PROPERTIES

The 1-oxa-3,8-diazaspiro(4,5)-2-decanethione derivatives and their physiologically tolerable salts of the present invention are valuable pharmaceutical products having above all bronchodilatory, antitussive, analgesic, anti-inflammatory and gastric antisecretory properties.

Their toxicity as studied in mice, showed that their $LD_{50}$ varies from 150 to >800 mg./kg. by the intraperitoneal route.

The new compounds inhibit bronchospasm in the guinea pig, provoked by an intravenous injection of histamine, serotonin or acetylcholine, according to the method of Konzett H., and Rossler R. (Arch. Exptl. Path. U. Pharmak. 195, 71 (1940)). Doses i.v. of 0.25 to 2.50 mg./kg. inhibit the spasm of 50%. When administered intraperitoneally at 2.50 to 10 mg./kg., they protect the guinea pig against bronchospasm induced by the inhalation of 4% of histamine to the extent of 50% (cf. A.K. Armitage, Brit. J. Pharmacol. 17, 196 (1961)).

It was also noted a good antitussive activity of the products of the invention. The effective dose which decreases the cough of the guinea pig submitted on a 40% citric acid aerosol for 4 minutes by 50% is situated between 10 and 20 mg./kg. subcutaneously (Gooswald R. Arzfschg. 8, 550 (1958)).

The analgesic activity was studied in mice by the hot plate method of Adami E. and Marazzi E. (Arch. Internat. Pharmacodyn. 107, 322 (1956)). It was observed that the new derivatives administered at 10 to 25 mg./kg. .P. increase the threshold of pain perception from 44 to 76%.

An anti-inflammatory activity was demonstrated according to the method of J. Hillebrecht (Arzfschg. 4, 607 (1954)). It was observed that the new compounds administered at decreasing doses of 2×80, 2×50, and 1×50 mg./kg. P.O. for 3 days, decrease from 27.5 to 76.3% the plantar oedema of the rat's paw included by intra plantar injection of 0.05 m.³ of kaolin at 10%.

The gastric antisecretory activity of the new compounds was studied by the technique of Shay H. (Gastroenterology 5, 43 1945)). It was observed that doses of 5 to 20 mg./kg. I.P. in rats decrease from 25 to 91% the free acid, and from 24 to 70% the pepsin output of the gastric secretion.

The above described pharmacological properties and the low toxicity of the compounds of the invention enable their use in thereapy, especially in the treatment of bronchospasm, cough, pain, inflammation and gastric hypersecretion.

The invention further includes pharmaceutical preparations containing a derivative of the General Formula I or a physiologically tolerable salt thereof in admixture or conjunction with a pharmaceutically suitable carrier such, for example, as distilled water, glucose, lactose, starch, talc, cocoa butter. The pharmaceutical forms may be: tablets, dragees, capsules, suppositories, injectable solutions for oral, rectal or parenteral administration at doses from 5 to 500 mg., 1 to 5 times per day.

The following examples illustrate the invention. Unless otherwise indicated, the melting points were determined on a Kofler heater:

EXAMPLE 1

1-oxa-3,8-diaza-8-phenethyl-spiro(4,5)-2-decanethione

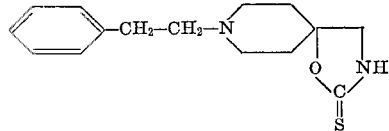

A solution of 13.6 g. (0.058 mol) of 1-phenethyl-4-aminomethyl-4-piperidinol (B.P. 170° C./0.2 mm.; M.P. 58–61° C.) in 50 ml. of ethanol of 95% strength is mixed with a solution of 4.56 g. (0.06 mol) of carbon disulphide in 25 ml. of ethanol of 95% strength at 10° C. whereupon an abundant white precipitate forms. The mixture is then heated for 8 hours under reflux until $H_2S$ is no longer being evolved. The mixture is then cooled and the white precipitate filtered off and dissolved in 100 ml. of N-hydrochloric acid and the precipitated colloidal sulphur is filtered off. The acid solution is rendered alkaline with potassium carbonate and the resulting precipitate is filtered off and dried. The base (13 g.) thus obtained, M.P. 195° C., is converted into the hydrochloride by addition of dry hydrochloric acid to an ethanolic solution of the base to yield 1 - oxa-3,8-diaza-8-phenethyl-spiro(4,5)-2-decanethione hydrochloride (11 g.) as white crystals, M.P. 257–258° C. (capillary).

The hydrochloride thus produced is dissolved in water, and made just alkaline by addition of saturated potassium carbonate solution to yield 1-oxa-3,8-diaza-8-phenethyl-spiro(4,5)-decanethione as a solid precipitate which is removed by filtration and dried.

In accordance with the foregoing procedure, but wherein place of 1-phenethyl-4-aminomethyl-4-piperidinol there is used as starting material 1-(p-fluorophenethyl)-4-aminomethyl-4-piperidinol, 1-(p-chlorophenethyl)-4-aminomethyl-4-piperidinol, 1-(p-methylphenethyl)-4-aminomethyl-4-piperidinol, and 1-(p-methoxyphenethyl)-4-aminomethyl-4-piperidinol there are obtained the corresponding 1-oxa-3,8 - diaza - 8-(p-fluorophenethyl)-spiro(4,5)-2-decanethione M.P. 192° C. (hydrochloride: M.P. 255° C. (capillary)), 1-oxa-3,8-diaza-8-(p-chlorophenethyl)spiro)4,5)-2-decanethione M.P. 192° C. (hydrochloride: M.P. 271° C. (decomp. capillary)), 1-oxa-3-8-diaza-8-(p-methylphenethyl)spiro(4,5)-2-decanethione, M.P. 193° C. and 1 - oxa - 3,8-diaza-8-(p-methoxy-phenethyl)spiro(4,5)-2-decanethione (hydrochloride: M.P. 265–266° C. (decomp. capillary)).

EXAMPLE 2

Utilizing the procedures of Example 1 above, but reacting 1 - (o-trifluoromethylphenethyl)-4-aminomethyl-4-piperidinol with carbon disulphide there is obtained 1-oxa-3,8 - diaza - 8 - (o-trifluoromethylphenethyl)spiro(4,5)-2-decanethione.

In accordance with the foregoing procedure but wherein place of 1-(o-trifluoromethylphenethyl)-4-aminomethyl-4-piperidinol there is utilized as starting material 1-(o-ethylphenethyl) - 4-aminomethyl-4-piperidinol, 1-(m-propoxyphenethyl)-4-aminomethyl-4-piperidinol, 1-(p-methylenedioxyphenethyl) - 4 - aminomethyl-4-piperidinol, 1-(o-sulphamidophenethyl)-4-aminomethyl-4-piperidinol, 1-(m-dimethylsulphamidophenethyl) - 4-aminomethyl-4-piperidinol, 1 - (p-aminophenethyl)-4-aminomethyl-4-piperidinol, 1 - (m-acetamidophenethyl)-4-aminomethyl-4-piperidinol, 1 - (o-benzamidophenethyl)-4-aminomethyl-4-piperidinol, and 1-[p-(p-chlorobenzamido)phenethyl]-4-aminomethyl-4-piperidinol there is obtained the corresponding 1-oxa-3,8 - diaza - 8 - (o-ethylphenethyl)-spiro(4,5)-2-decanethione, 1-oxa-3,8-diaza-8-(m-propoxyphenethyl)-spiro(4,5)-2-decanethione, 1-oxa-3,8-diaza-8-(p-methylenedioxyphenethyl) - spiro(4,5) - 2-decanethione, 1-oxa-3,8-diaza-8-(o-sulphamidophenethyl) - spiro(4,5)-2-decanethione, 1-oxa-3,8 - diaza-8-(m-dimethylsulphamidophenethyl)-spiro(4,5) - 2-decanethione, 1-oxa-3,8-diaza-8-(o-nitrophenethyl)-spiro(4,5) - 2 - decanethione, 1-oxa-3,8-diaza-8-(p-aminophenethyl) - spiro(4,5)-2-decanethione, 1-oxa-3,8-diaza-8-(m - acetamidophenethyl) - spiro(4,5)-2-decanethione, 1-oxa - 3,8 - diaza-8-(o-benzamidophenethyl)-spiro(4,5)-2-decanethione, and 1-oxa-3,8-diaza-8-[p-(p-chlorobenzamido)phenethyl]-spiro(4,5)-2-decanethione.

We claim:
1. A compound selected from the group consisting of
(A) 1 - oxa - 3,8-diazaspiro(4,5)-2-decanethione compounds of the General Formula I

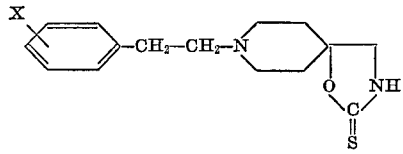

wherein X is a substitutent selected from the group formed of halogen, hydrogen, trifluoromethyl, lower alkyl and alkoxy containing 1 to 4 carbon atoms, methylenedioxy, sulfamido, dimethylsulfamido, nitro, amino and acylamino of formula RCONH—, wherein R is a substituent selected from a lower alkyl up to $C_4$, phenyl and para-chlorophenyl and (B) physiologically acceptable addition salts thereof with suitable acids or bases.

2. A compound of claim 1 which is 1-oxa-3,8-diaza-8-phenethyl-spiro(4,5)-2-decanethione.
3. A compound of claim 1 which is 1-oxa-3,8-diaza-8-(p-fluorophenethyl)-spiro(4,5)-2-decanethione.
4. A compound of claim 1 which is 1-oxa-3,8-diaza-8-(p-chlorophenethyl)-spiro(4,5)-2-decanethione.
5. A compound of claim 1 which is 1-oxa-3,8-diaza-8-(p-methylphenethyl)-spiro(4,5)-2-decanethione.
6. A compound of claim 1 which is 1-oxa-3,8-diaza-8-(p-methoxyphenethyl)-spiro(4,5)-2-decanethione.
7. A process for the preparation of a compound of General Formula I of claim 1 which comprises reacting a compound of the formula

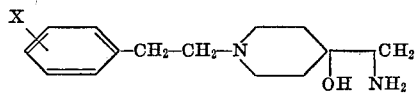

wherein X is as in claim 1 with carbon disulfide.
8. A process of claim 7 wherein the reactants are heated under reflux in a lower alkanol.
9. A process of claim 8 which comprises the additional step of isolating the reaction product.

References Cited

UNITED STATES PATENTS 2,075,359   3/1937   Salzberg et al. _____ 424—250

OTHER REFERENCES

Chem. Abstracts, vol. 64: 12679f (1966), Science Union.

Medicinal Chemistry, Burger, vol. I, pp. 36, 37, 44, 45, 48 (1951).

HENRY R. JILES, Primary Examiner

S. D. WINTERS, Assistant Examiner

U.S. Cl. X.R.

260—293.4A, 293.4G, 294A, 294.7D, 294.7L, 294S; 424—267

UNITED STATES PATENT OFFICE
CERTIFICATE OF CORRECTION

Patent No. 3598828          Dated August 10, 1971

Inventor(s) GILBERT REGNIER et al.

It is certified that error appears in the above-identified patent and that said Letters Patent are hereby corrected as shown below:

Column 3, lines 61-68 delete all, insert as follows:

...ternat. Pharmacodyn. 107, 322 (1956)). It was observed that the new derivatives administered at 10 to 25 mg./kg. I.P. increase the threshold of pain perception from 44 to 176+.

An anti-inflammatory activity was demonstrated according to the method of J. Hillebrecht (Arzfschg. 4, 607 (1954)). It was observed that the new compounds administered at decreasing doses of 2x80, 2x50, and...

Column 3, line 71 delete "$0.05m^3$", insert ...$0.05cm^3$---

Signed and sealed this 28th day of March 1972.

(SEAL)
Attest:

EDWARD M. FLETCHER, JR.      ROBERT GOTTSCHALK
Attesting Officer             Commissioner of Patents